United States Defensive Publication [19] (H) [11] T953,006

Raley et al. [43] Dec. 7, 1976

[54] ANTISTATIC CELLULAR POLYOLEFIN RESIN PRODUCTS

[75] Inventors: Charles F. Raley; John F. Rudd, both of Midland, Mich.

[73] Assignee: The Dow Chemical Company, Midland, Mich.

[21] Appl. No.: 652,605

[22] Filed: Jan. 26, 1976

[51] Int. Cl.[2] ..... C08J 9/06

[52] U.S. Cl. ..... 260/2.5 R

[57] ABSTRACT

Antistatic cellular polyolefin resin products and articles thereof are provided wherein the olefin polymer composition of the cellular composition comprises an antistatic agent, especially an amine having at least one long aliphatic hydrocarbyl chain or a salt thereof, especially a quaternary ammonium salt, in amount effective to reduce the electrostatic charge decay half-life time to less than about 2 minutes in normal ambient air atmosphere.

Typical are polyethylene foams having density from about 1.5 to about 50 pounds per cubic foot comprising from about 0.01 to about 5, preferably from about 0.1 to about 0.5, weight percent, N,N-bis(2-hydroxyethyl)alkyl amine mixture wherein the alkyls are hexadecyl, octadecyl and octadecenyl.

3 Claims, No Sheets Drawing,

9 Pages Specification

The file of this unexamined application may be inspected and copies thereof may be purchased (849 O.G. 1221, Apr. 9, 1968).